May 21, 1968     D. B. RAINES     3,384,424

EXTERNAL CROSS STRAP ELASTIC PIVOT

Original Filed March 25, 1964     2 Sheets-Sheet 1

INVENTOR.
DONALD B. RAINES
BY White & Haefliger
ATTORNEYS.

May 21, 1968 D. B. RAINES 3,384,424
EXTERNAL CROSS STRAP ELASTIC PIVOT
Original Filed March 25, 1964 2 Sheets-Sheet 2
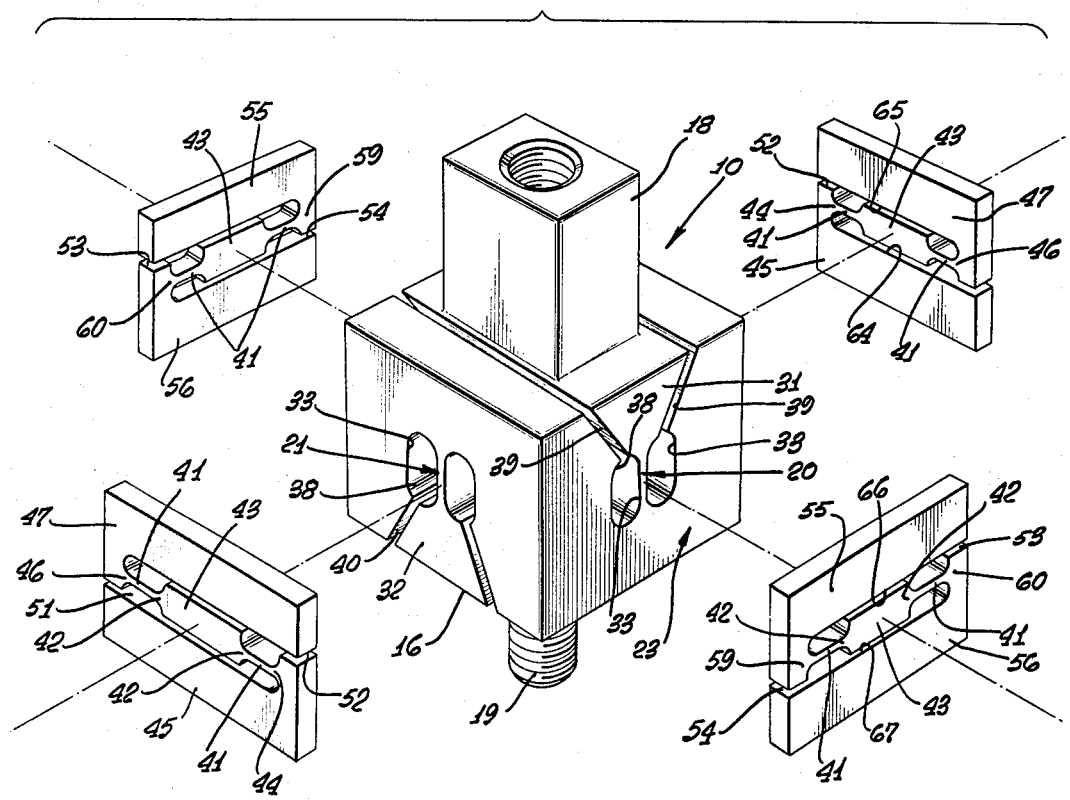
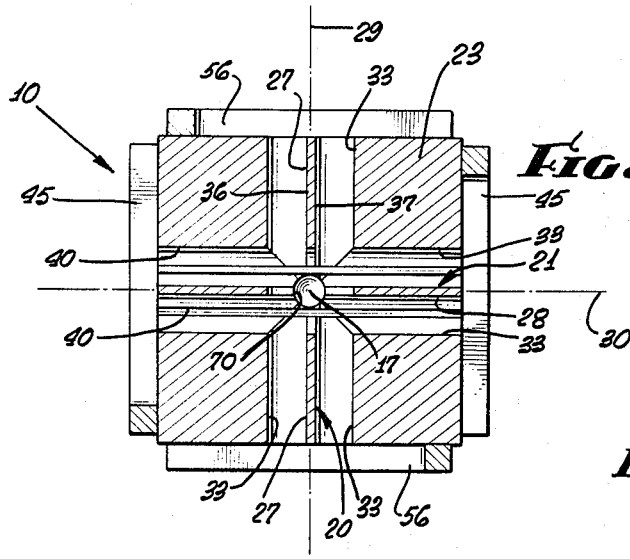
INVENTOR.
DONALD B. RAINES
BY *White & Haefliger*
ATTORNEYS.

United States Patent Office 3,384,424
Patented May 21, 1968

3,384,424
EXTERNAL CROSS STRAP ELASTIC PIVOT
Donald B. Raines, Fullerton, Calif., assignor to Task Corporation, Anaheim, Calif., a corporation of California
Continuation of application Ser. No. 354,579, Mar. 25, 1964. This application Dec. 29, 1966, Ser. No. 605,936
3 Claims. (Cl. 308—2)

ABSTRACT OF THE DISCLOSURE

The disclosed elastic pivot incorporates pairs of longitudinal flexure webs defining perpendicular and axial planes within a block, and plates at the block sides defining lateral webs, stiffening mass between the lateral webs, stop shoulders limiting flexing of the longitudinal webs, and stop shoulders limiting deflection of the lateral webs and mass.

This is a continuation of application Ser. No. 354,579, filed Mar. 25, 1964.

This invention relates generally to elastic pivots, and more particularly has to do with a novel pivot having substantially improved lateral and torsional load handling characteristics.

Devices of the general type with which the invention is concerned are used typically as limited motion pivots between a source of loading and load meters or sensing devices, for the purpose of transmitting only axially imposed loading to the meters, as opposed to transmitting laterally imposed loads. In other words, such devices may be characterized as acting to segregate axial from lateral loading as respects transmission thereof to the meter. These devices find wide application in force measuring and weighing systems where different meters measure longitudinal and lateral loading and are to be isolated from loading and moments other than those to be measured. The quality of such a device is therefore determined at least in part by its ability to function in this manner, and it is a major object of the invention to provide a novel device of this type which will so function in this manner, and it is a major object of the invention to provide a novel device of this type which will so function in a better or more efficient manner particularly as respects the amount of loading which the device will handle without failure, for a given overall size of the device.

As broadly conceived, the improved elastic pivot unit comprises a body having opposite ends longitudinally spaced apart in the direction of the body axis to receive application of force, the body having certain or longitudinal web means to transmit the bulk of the longitudinal loading applied through a body end, the unit also including other or lateral web means to transmit the bulk of the lateral loading applied through a body end. The web means are further characterized in that the longitudinal webs are adapted to flex in response to application of lateral loading, while the lateral webs flex in response to application of longitudinal loading. Finally, at least one of the web means includes two spaced apart substantially coplanar webs, and substantially inflexible means is provided to transmit force between the two spaced webs. It is found that if the lateral web means incorporate the two spaced webs connected by inflexible intermediate structure, they then have a higher degree of flexibility in response to application of longitudinal loading than a single lateral web of length equal to the combined lengths of the two webs would have, for a given degree of overall stiffness in response to applied lateral loading. Otherwise stated, the lateral web means incorporating the two spaced webs connected by inflexible intermediate structure have a higher degree of overall stiffness in response to applied lateral loading than a single lateral web of length equal to the combined lengths of the two webs would have, for a given degree of flexibility in response to applied longitudinal loading. Accordingly, a greater degree of isolation of longitudinal and lateral loading is achieved by means of the present elastic pivot, substantially improving its quality as respects use in measurement of applied loading.

More specifically, the body may take the form of a block having opposite ends and four sides, there being a pair of series connected lateral or auxiliary webs at each side of the block, and the inflexible means connecting each pair of webs may comprise metallic mass extending at opposite sides of a plane normal to the block axis and defined by the four pairs of webs, the mass longitudinal thickness being substantially greater than the lateral web thickness. Further, the webs of each series connected pair typically have their closest laterally spaced terminals interconnected through the inflexible metallic mass, and their furthest separated terminals are typically respectively connected through plate structure with an end portion of the block and with block intermediate structure which transmits longitudinal loading between pairs of longitudinal webs. As to the latter, one pair of longitudinal webs typically extends in a longitudinal plane normal to a longitudinal plane defined by the other pair of longitudinal webs. Also, shoulders are provided to face the metallic mass for limiting bodily deflection thereof relative to the common plane of the lateral webs, and in response to flexing of the latter.

These and other objects of the invention, as well as the details of an illustrative embodiment, will be more fully understood from the following detailed description of the drawings, in which:

FIG. 5 is an exploded perspective showing of the FIG. 1 embodiment; and

FIG. 6 is a section taken on line 6—6 of FIG. 1.

Figure 1:
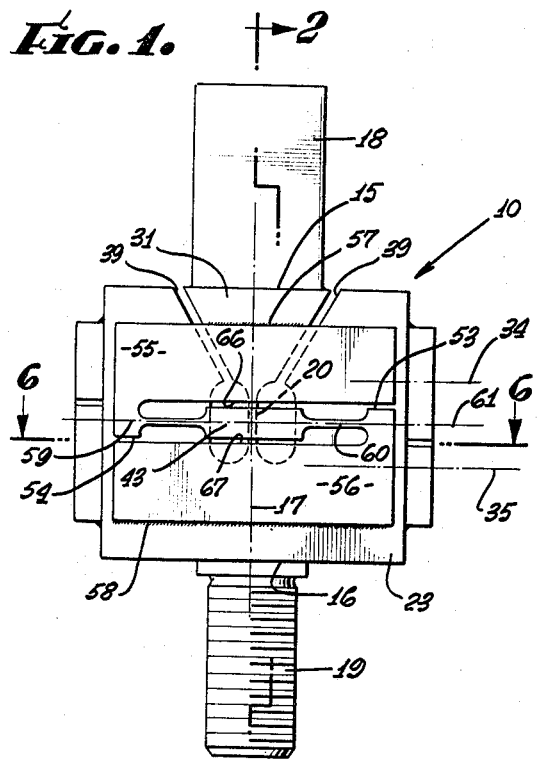
FIG. 1 is a side elevational view of one embodiment of elastic pivot incorporating the invention.

Referring now to FIGS. 1 through 6, the elastic pivot unit 10 comprises a body, typically of block construction, having opposite ends 15 and 16 which are longitudinally spaced apart in the direction of the body axis 17 to receive application of force. Such force may be transmitted to and from the body by threaded fastening means typically in the form of interiorly and exteriorly threaded studs 18 and 19 respectively projecting axially oppositely from the opposite ends of the body.

The body also has first and second web means respectively indicated at 20 and 21 in FIGS. 5 and 6, as well as body intermediate extent 23 for transmitting the bulk of axially imposed force between the body ends and in sequence through the first web means 20, then through the body intermediate extent 23, and then through the second web means 21. As shown in FIG. 6, the first web means may typically but not necessarily comprise a first pair of webs 27 which are spaced apart at opposite sides of the body longitudinal axis 17, and the second web means may typically but not necessarily comprise a second pair of webs 28 spaced apart at opposite sides of the axis 17. The two webs 27 extend in a common longitudinal plane 29 which intersects the axis 17 along its length, and also the two webs 28 extend in a common longitudinal plane 30 which intersects the axis 17 as well as the plane 29. In other words, the planes 29 and 30 have substantially perpendicularly intersecting relation lengthwise along the axis 17 as shown in FIG. 6. In this regard, it will be observed in FIGS. 1 through 5 that the body means has rigid beam portions 31 and 32 through which loading is transmitted between the body opposite ends 15 and 16 and the web means 20 and 21.

Further in connection with what has been described, one-piece construction of the block 10 is facilitated by the provision of four pairs of recesses 33, the recesses of each pair being located at transversely opposite sides of a web such as has been described. These recesses extend from the four outer sides of the body to the body interior where they intersect as best seen in FIG. 6. Furthermore, the recesses are longitudinally elongated between a pair of longitudinally spaced parallel planes 34 and 35 perpendicular to the axis 17 as seen in FIG. 1. Thus, the recesses have equal longitudinal extent, and the recesses of each pair are so formed that the web between the recesses has reduced lateral thickness between parallel opposite faces such as are shown at 36 and 37 in FIG. 6. The corners of the recesses 33 are rounded or curved typically as shown at 38 to reduce stress concentrations.

Figure 2:
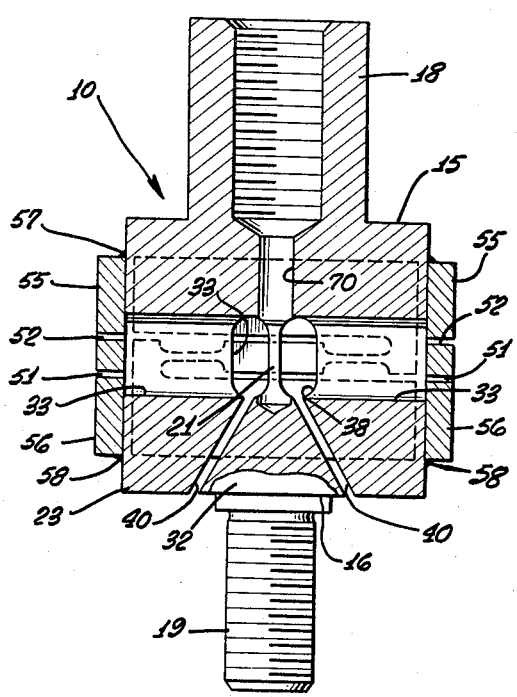
FIG. 2 is a section taken on line 2—2 of FIG. 1.
Figure 3:
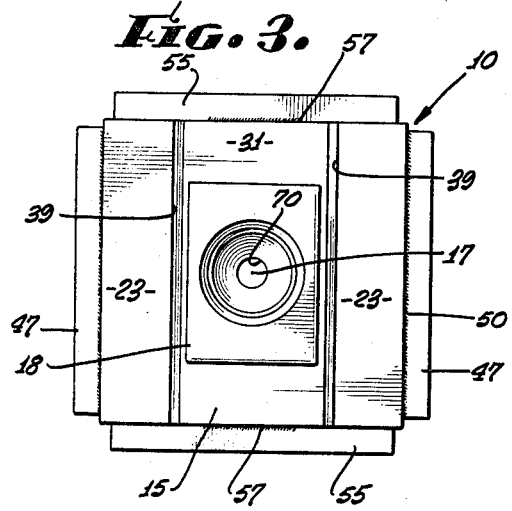
FIG. 3 is a top plan view of the FIG. 1 embodiment.
Figure 4:
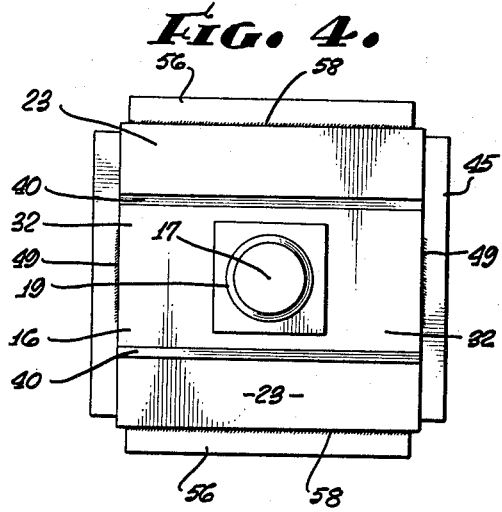
FIG. 4 is a bottom plan view of the FIG. 1 embodiment.

The body also contains two pairs of slots, the first pair of slots being shown at 39 in FIG. 1 and the second pair being shown at 40 in FIG. 2. Slots 39 extend or converge longitudinally from the outside of the body near end 15 thereof into communication with the recesses 33 at opposite sides of the first web means 20, whereas the second pair of slots 40 extend or converge longitudinally from the outside of the body near end 16 thereof into communication with the recesses 33 at opposite sides of the second web means 21. As shown, the slots 39 extend in tapering planes which are at substantial angles to the tapering planes of slots 40, and the rigid beam portions 31 and 32 are formed between the respective pairs of slots 39 and 40.

The relatively elongated extent of the webs 27 and 28 is advantageous from the standpoint of increased flexibility thereof so that the device is sensitive to relatively small moments acting in longitudinal planes and will flex in response thereto, thereby permitting the system incorporating these devices to better segregate the axial and lateral loads. In this connection, the webs 27 and 28 are adapted to flex in response to application to the body ends of moments acting in longitudinal planes parallel to the body axis 17. On the other hand, such relatively elongated extent of the webs raises problems of buckling which can occur in different modes depending upon restraints or lack thereof imposed upon the webs. To take advantage of that buckling mode which is associated with the ability of the longitudinal web means 20 and 21 to carry maximum longitudinal loading without buckling, other or auxiliary web means is provided to transmit the bulk of the lateral loading applied through an end of the body, and to flex in response to application of longitudinal loading through the body end. As will be seen, said other web means includes two spaced apart substantially coplanar webs, and in addition substantially inflexible means is connected in series between the two coplanar webs to transmit lateral force therebetween. Typical of such auxiliary web means are the like pairs of webs indicated generally at 41 in the drawings, there being four such pairs, one at each of the four sides of the block 10. As is clear from the drawings, the webs 41 of each pair are spaced apart laterally in the direction of lateral force transmission therethrough, and they have their closest laterally spaced apart terminals 42 interconnected through the substantially inflexible means indicated at 43.

The furthest separated terminals of each pair of webs 41 are respectively connected with an end portion of the block and with the block intermediate structure. For example, web terminals 44 are connected to block end portion 16 via plate structure 45, whereas web terminals 46 are connected to block intermediate structure 23 via plate structure 47. In this regard, suitable connection of the plate structure 45 to the lateral terminals of rigid beam portion 32 is made by edge weld 49, whereas edge weld 50 connects plate structure 47 to block intermediate structure 23, as seen in FIGS. 1–4. Plate structures 45 and 47 interconnected by coplanar webs 41 and intermediate structure 43 have a modified S-shape, since slits are provided at 51 and 52 between the plates. The plate shoulders forming these slits are typically interengageable in response to flexing of longitudinal web means 21 to limit such flexing.

In similar manner, slits 53 and 54 are formed by stop shoulders of plate structures 55 and 56 to limit flexing of longitudinal web means 30, plate structures 55 being connected via welds 57 to opposite lateral terminals of rigid beam 31 at the block end 15, and plate structures 56 connected via welds 58 to block intermediate structure 23. Plate structures 55 and 56 are interconnected via pairs of coplanar webs 41, the latter having their closest ends 42 connected via inflexible means 43, the plate structures 55 and 56 also being connected to the webs at their furthest apart terminals 59 and 60 respectively.

The inflexible means 43 typically comprises a metallic mass extending at opposite sides of the common plane 61 of the coplanar webs 41, as best seen in FIG. 1, and with thickness in a direction normal to plane 61 which is substantially in excess of the thickness of the adjoining coplanar webs 41. As pointed out in the introduction, the mass 43 acts to increase the stiffness against buckling of the assembly that includes the mass and its adjoining webs 41, buckling being induced by sufficient lateral loading. Stated another way, the assembly has increased capacity to flex in response to applied longitudinal loading. Accordingly, the combination of elements increases substantially the desirable characteristics of the pivot unit, without increasing its overall size.

Stop shoulders extending laterally at 64 and 65 on plate structures 45 and 47, and at 66 and 67 on plate structures 55 and 56, face the mass 43 to limit bodily deflection thereof relative to plane 61 and in response to flexing of webs 41. As is clear from the drawings, the lateral webs 41 placed at all four sides of the block are capable of transmitting lateral loading in all lateral directions relative to longitudinal axis 17, as well as torsional loading about that axis. FIGS. 2 and 6 illustrate a drilled out opening 70 extending along axis 17 in the rigid beam portion 31 to enable a drill to remove the central web structure at axis 17 and near plane 61.

I claim:

1. In an elastic pivot unit comprising a block having a principal axis and axially spaced opposite ends, the block having first and second transverse beam portions respectively extending generally axially inwardly from said opposite ends, the block also having intermediate extent separated from opposite sides of each beam portion by slots directed generally inwardly and toward said axis, the first beam portion terminating at a first pair of transversely spaced principal webs defining a first principal axial plane and the second beam portion terminating at a second pair of transversely spaced principal webs defining a second principal axial plane, said planes extending in mutually perpendicular and intersecting relation, there being recesses at opposite sides of the first principal webs and which intersect the slots at opposite sides of the first beam portion and there being recesses at opposite sides of the second principal webs and which intersect the slots at opposite sides of the second beam portion, said block intermediate extent interconnecting said first and second webs, and the block having four sides two of which extend generally parallel to said first plane and another two of which extend generally parallel to said second plane, the improvement which comprises integral S-shaped plate structure at each of said four sides of the block, each plate structure including axially spaced primary and secondary legs respectively connected to the block beam portion and intermediate extent at a blockside, the plate structure also including a third leg intermediate the primary and secondary legs and having transversely elongated and spaced apart relatively thin auxiliary flexure webs defining a third plane substantially normal to said principal axis, the third leg also including a transversely elongated relatively thick mass interconnecting said auxiliary flexure webs, said primary and secondary legs extending transversely and defining stop shoulders located in closely spaced relation to said mass at axially opposite sides thereof to confine said mass for limiting bodily deflection in the direction of said axis, said mass being intersected by a principal plane proximate said stop shoulders, said plate structure having other stop shoulders transversely spaced from said mass and limiting relative displacement of said primary and secondary legs, said primary and secondary legs each having terminal portions proximate said other stop shoulders and with transverse spacing greater than the transverse spacing of the furthest apart terminals of said third leg.

2. The pivot unit of claim 1 wherein said other stop shoulders are located proximate a corner of the block and proximate the connection of one of said auxiliary webs with one of said primary and secondary legs said mass transversely bridging the recesses opening at a side of the block, each recess being transversely substantially wider than the principal web adjacent thereto.

3. The pivot of claim 1 wherein the auxiliary webs of all of the plate structures are in said third plane.

References Cited
UNITED STATES PATENTS

| | | | |
|---|---|---|---|
| 2,757,050 | 7/1956 | Weher | 308—2 |
| 2,803,134 | 8/1957 | Ward | 73—141 |
| 2,860,495 | 11/1958 | Stark | 64—15 X |
| 2,937,053 | 5/1960 | Rigney | 308—2 |
| 2,960,302 | 10/1960 | Brown | 308—2 |
| 2,966,049 | 12/1960 | Ormond | 308—2 |
| 3,063,670 | 11/1962 | Young | 248—358 X |
| 3,073,584 | 1/1963 | Troeger | 308—2 X |
| 3,110,175 | 11/1963 | Seed. | |
| 3,138,953 | 6/1964 | Ormond | 73—116 |
| 3,203,739 | 8/1965 | Young | 308—2 |
| 3,246,890 | 4/1966 | Ormond | 287—85 |

MARTIN P. SCHWADRON, *Primary Examiner.*

L. L. JOHNSON, *Assistant Examiner.*